United States Patent [19]

Frank

[11] Patent Number: 4,596,592

[45] Date of Patent: Jun. 24, 1986

[54] STOP MEMBERS FOR GLASS SHEET SHAPING MOLDS

[75] Inventor: Robert G. Frank, Murrysville, Pa.

[73] Assignee: PPG Industries, Inc., Pittsburgh, Pa.

[21] Appl. No.: 729,844

[22] Filed: May 2, 1985

[51] Int. Cl.$^4$ ............................................. C03B 23/03
[52] U.S. Cl. ....................................... 65/273; 65/106; 65/287
[58] Field of Search ................... 65/106, 107, 273, 287

[56] References Cited

U.S. PATENT DOCUMENTS

| | | |
|---|---|---|
| 2,695,476 | 11/1954 | Jendrisak . |
| 2,729,032 | 1/1956 | White . |
| 2,798,338 | 7/1957 | Jendrisak . |
| 2,814,164 | 11/1957 | Carson et al. . |
| 2,840,953 | 7/1958 | Black . |
| 2,901,866 | 9/1959 | McKelvey et al. . |
| 3,089,319 | 5/1963 | Carson et al. . |
| 3,220,822 | 11/1965 | Jendrisak . |
| 3,230,067 | 1/1966 | Carson et al. . |
| 4,272,275 | 6/1981 | Reese . |
| 4,488,893 | 12/1984 | Claassen .......................... 65/106 X |

Primary Examiner—Arthur Kellogg
Attorney, Agent, or Firm—Andrew C. Siminerio

[57] ABSTRACT

A stop assembly for positioning glass sheets that are pressed between upper and lower shaping molds. The stop member is pivoted into a sheet engaging position as the sheet is heated and conveyed onto a gas hearth. As a lifting ring which surrounds the gas hearth moves vertically, lifting the sheet off the gas hearth and towards the upper mold face, the stop assembly rotates to a position outside the pressing surface of the upper and lower molds.

10 Claims, 9 Drawing Figures

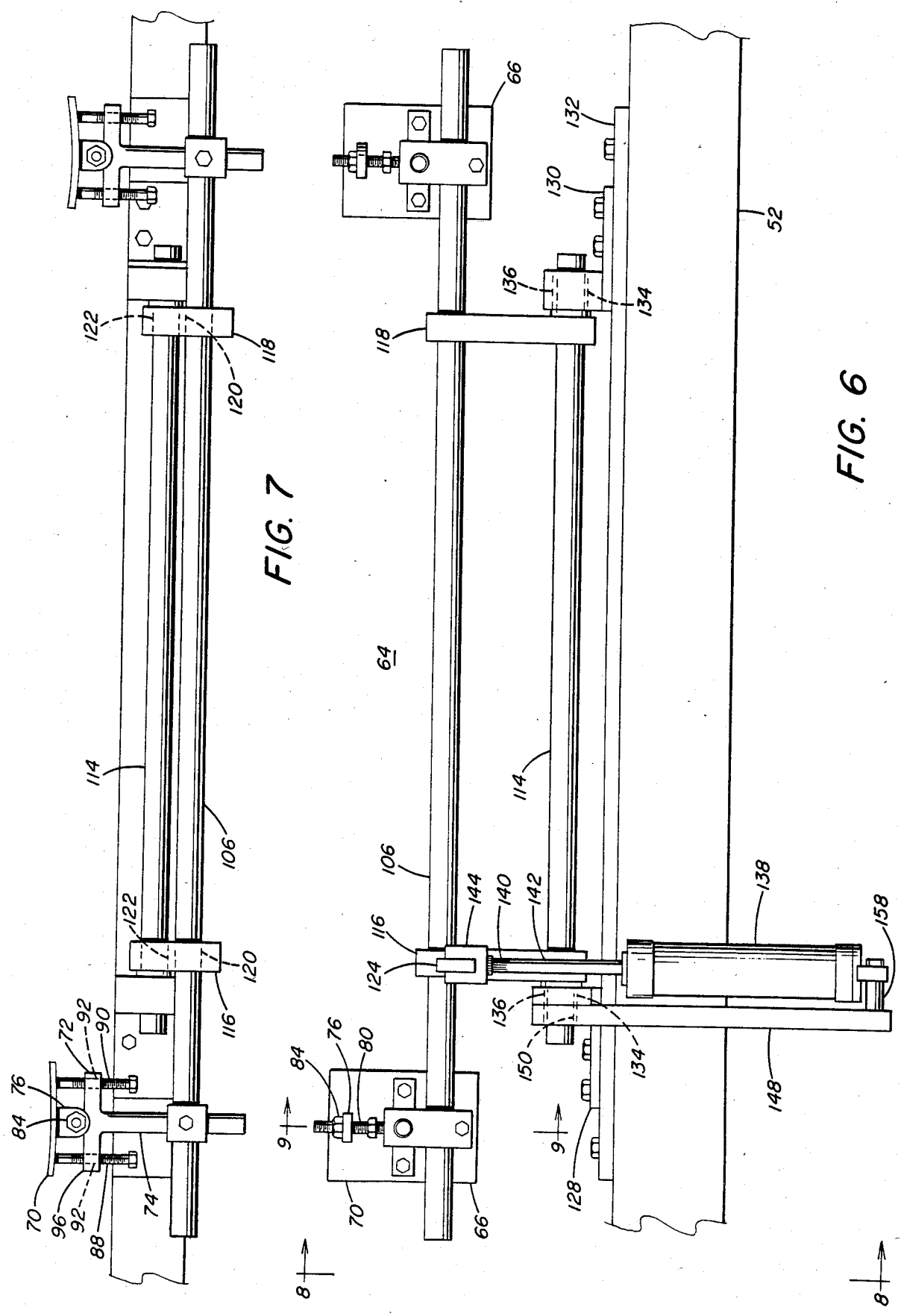

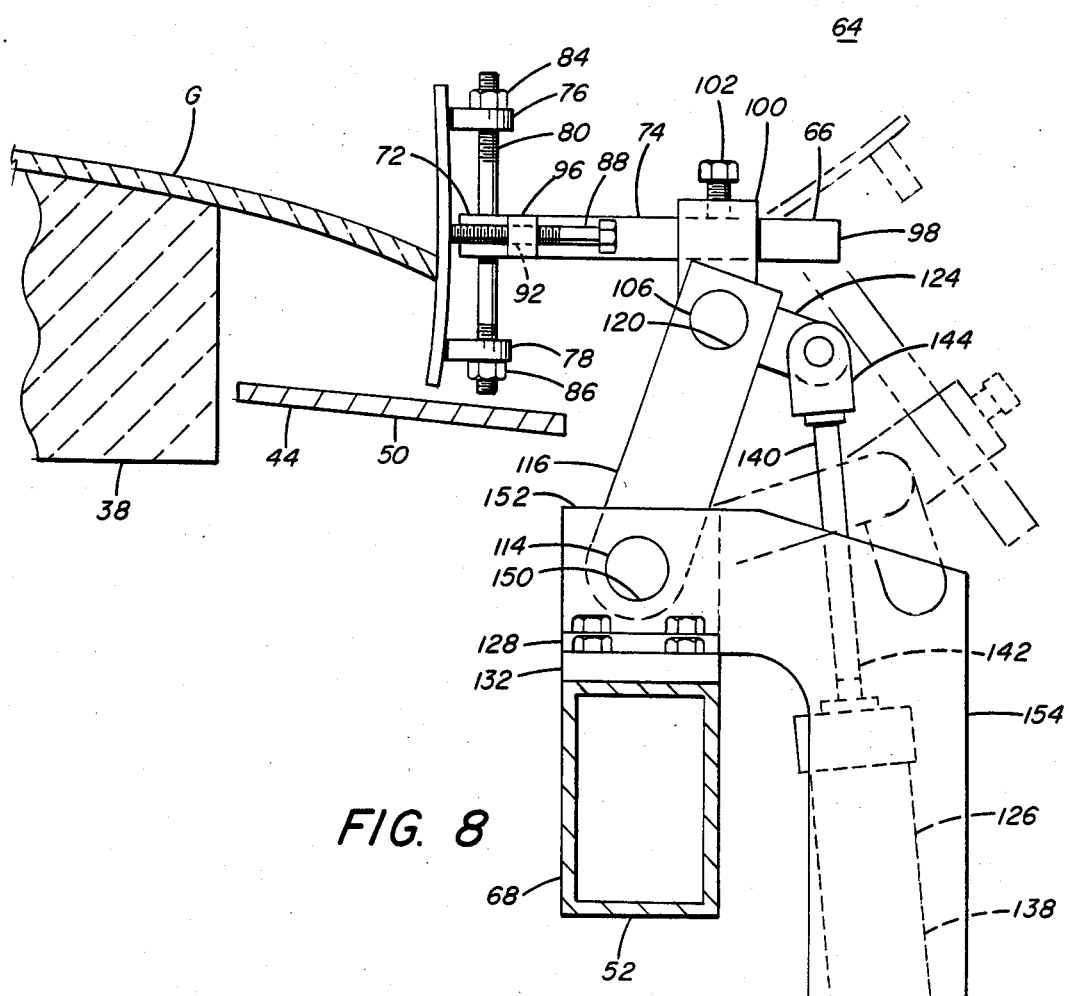
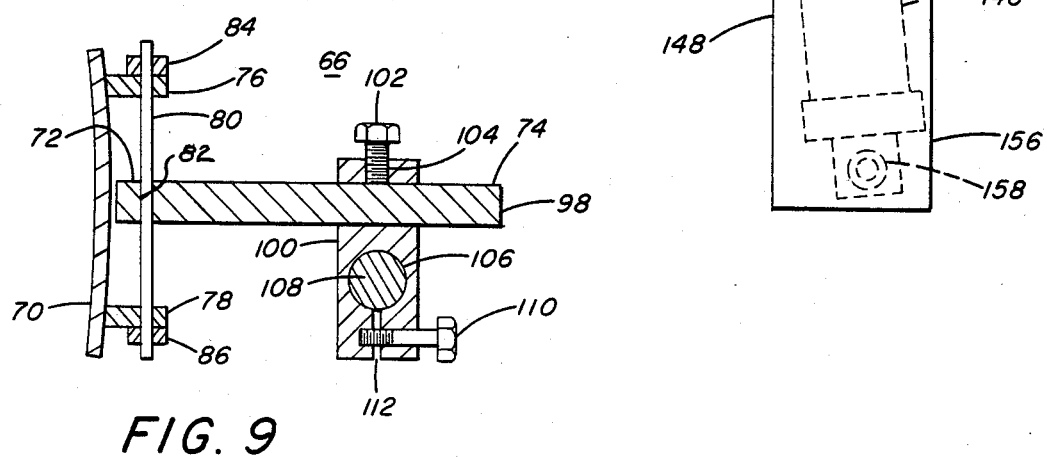

STOP MEMBERS FOR GLASS SHEET SHAPING MOLDS

BACKGROUND OF THE INVENTION

1. Field of Invention

The present invention relates generally to the production of bent sheets and more particularly to a stop assembly for positioning glass sheets that are pressed between upper and lower shaping molds.

2a. Technical Considerations

Bent glass sheets are commonly used as glazed enclosures in vehicles such as automobiles and the like. For such applications, the glass sheets must be bent to precisely defined curvatures dictated by the configuration and outline of the vehicle openings in which the sheets are to be installed, as well as the overall styling of the vehicle. At the same time, it is important that the bent sheets meet very stringent optical requirements so that the viewing area of the resulting shaped window is free of optical defects that would interfere with good vision through the window. For certain windows used as glazed enclosures, bent glass sheets are tempered to strengthen them and increase their resistance to damage resulting from impact. The particles resulting from the breakage of tempered glass are relatively small and smoothly surfaced, and thus are less likely to cause damage to an occupant of a vehicle than untempered glass, which fractures under less severe loads and causes particles having jagged edges of a larger particle size that are more likely to injure vehicle occupants.

In the glass sheet bending art, the glass sheet can be supported and press bent in a horizontal position. The glass sheets are generally supported, either on a series of conveyor rolls or by a gaseous hearth bed which supports the glass in close relation thereover by hot gas. The glass is then lifted from proximity to the support plane into engagement with a vacuum holder and then deposited onto a ring-like member, which is interposed between the plane of support and the bottom surface of the vacuum holder. The need for a glass sheet alignment member becomes increasingly more critical when the glass sheet is to be shaped to a complicated shape defined by a downwardly facing surface of a vacuum mold and an upwardly facing surface of complimentary shape of a vertically movable outline lifting mold. Furthermore, when the heat softened glass sheet is shaped by moving it over a gas hearth bed having a downwardly curved downstream end portion that curves downward to cause the glass sheet to flow downward and sag along its leading edge portion, it is important to have alignment means in position to engage the leading edge of the glass sheet even when the vertically movable outline mold occupies a recessed position. It is equally important that once the glass sheet is properly aligned, it remain aligned until it is lifted off the support surface and is fully engaged by the vertically movable outline mold.

2b. Patents of Interest

U.S. Pat. Nos. 2,695,476 and 2,798,338 to Jendrisak and U.S. Pat. No. 2,729,032 to White disclose outline molds that have glass edge engaging members that pivot inward to follow the edges of the glass sheet as it sags towards the outline mold. The glass sheet engaging members must be removed manually to remove the bent glass sheet from the mold.

U.S. Pat. Nos. 2,814,164 and 3,089,319 to Carson and White disclose outline molds having universally pivotable stops that follow and engage pointed tips at the opposite longitudinal edges of glass sheets supported for bending on the outline mold, to control tip over bending as well as positioning.

U.S. Pat. No. 2,840,953 to Black discloses bimetal actuators attached to glass edge guide members to change the location of the guide members in response to a change in temperature during the bending cycle. When the mold is cool, the bimetal actuators position the edge guides into proper positions for aligning a glass sheet edge. When the mold is heated to heat soften the glass, the bimetal actuators move the edge guide members out of contact with the glass, thus losing the contact between the guide members and the glass sheet edge that maintains the glass in proper mold alignment.

U.S. Pat. No. 2,901,866 to McKelvey discloses outline molds with counterweighted, pivoted glass engaging members that pivot against the glass sheet edge as the glass sags toward the shaping surface of the outline mold. No provision is made to disengage the glass edge after the glass bend is completed except for manual operation.

U.S. Pat. No. 3,220,822 to Jendrisak discloses sectionalized outline molds having a pivoted end portion for each end mold section that follow the ends of the glass sheet as the latter shortens from a flat shape to a shaped curved in elevation. Manual operation is also required here to separate the end portions from the bent glass sheet.

U.S. Pat. No. 3,230,067 to Carson and Stickel discloses an outline sectionalized shaping mold comprising pivotally supported shaped members that serve both as edge guides and supports for the flat glass sheet that rotate outwardly from the guide side edges as the mold closes and the glass sheet sags. Outward rotation permits the likelihood of glass sheet misalignment during shaping.

U.S. Pat. No. 4,272,275 to Reese discloses an apparatus for press bending glass sheets that are sag bent in an outline shape of an outline mold and are conveyed into a compound bending station having upper and lower press bending molds of complicated shape including a transverse bend of an S-shaped configuration. There, the lower press bending mold lifts the preliminarily bent glass sheet into engagement with the upper press bending mold to develop a compound glass sheet shape. The lower press bending mold lowers to redeposit the compound bent glass onto the lower mold. The apparatus of this patents includes glass edge engaging members for the outline mold that occupy a glass engaging position during one phase of the shaping cycle (such as when the glass is initially conveyed on the outline mold to develop a longitudinal component of bend) and are automatically removed from glass edge engagement immediately before the longitudinally bent glass is lifted from the outline mold for further processing. Such glass edge engaging members cannot continue to align the glass sheet on the outline mold when returned thereto after further processing. In addition, the glass edge engagement members are reset in proper position by hand for a subsequent cycle.

It would be beneficial for the glass sheet shaping art to develop apparatus for bending glass sheets to a compound bend that includes glass edge alignment members that establish a position of alignment for a glass sheet arriving at a shaping station and remains in place until immediately prior to when the lower outline mold engages an upper vacuum mold without causing damage to the glass edge or any shaping station part.

SUMMARY OF THE INVENTION

The present invention provides an apparatus for positioning a sheet on a mold. Sheet engaging members are mounted on a pivoting frame. A cylinder assembly pivots the frame so that the sheet engaging members move from a sheet engaging position wherein the engaging members overlay and extend from the sheet engaging surface of the mold to a sheet non-engaging position wherein the engaging members no longer overlay the sheet engaging surface and are adjacent to the mold.

The present invention further provides that the mold is a lower mold and further includes an upper mold disposed vertically above the lower mold. The upper mold has a downwardly facing sheet engaging surface that compliments the upwardly facing sheet engaging surface of the lower mold. When the upper and lower molds are vertically spaced from each other, the engaging position of the sheet engaging member is between the sheet engaging surfaces of the molds. When the upper and lower molds move toward each other to shape a sheet that is positioned therebetween, the non-engaging position of the sheet engaging member is in an area removed from the space between the sheet engaging surfaces of the molds.

DESCRIPTION OF THE DRAWINGS

FIG. 6 is a frontal view of the glass sheet positioning assembly on the outline lifting mold illustrated in FIG. 2 and as viewed from the right side of FIG. 2, with portions omitted for clarity.

FIG. 7 is a top view of the glass sheet positioning assembly illustrated in FIG. 6, with portions omitted for clarity.

FIG. 8 is a view along line 8—8 of FIG. 6 having a leading edge of a sheet in engagement with the sheet positioning assembly of this invention.

FIG. 9 is a view along line 9—9 of FIG. 6.

DESCRIPTION OF PREFERRED EMBODIMENT

Figure 1:
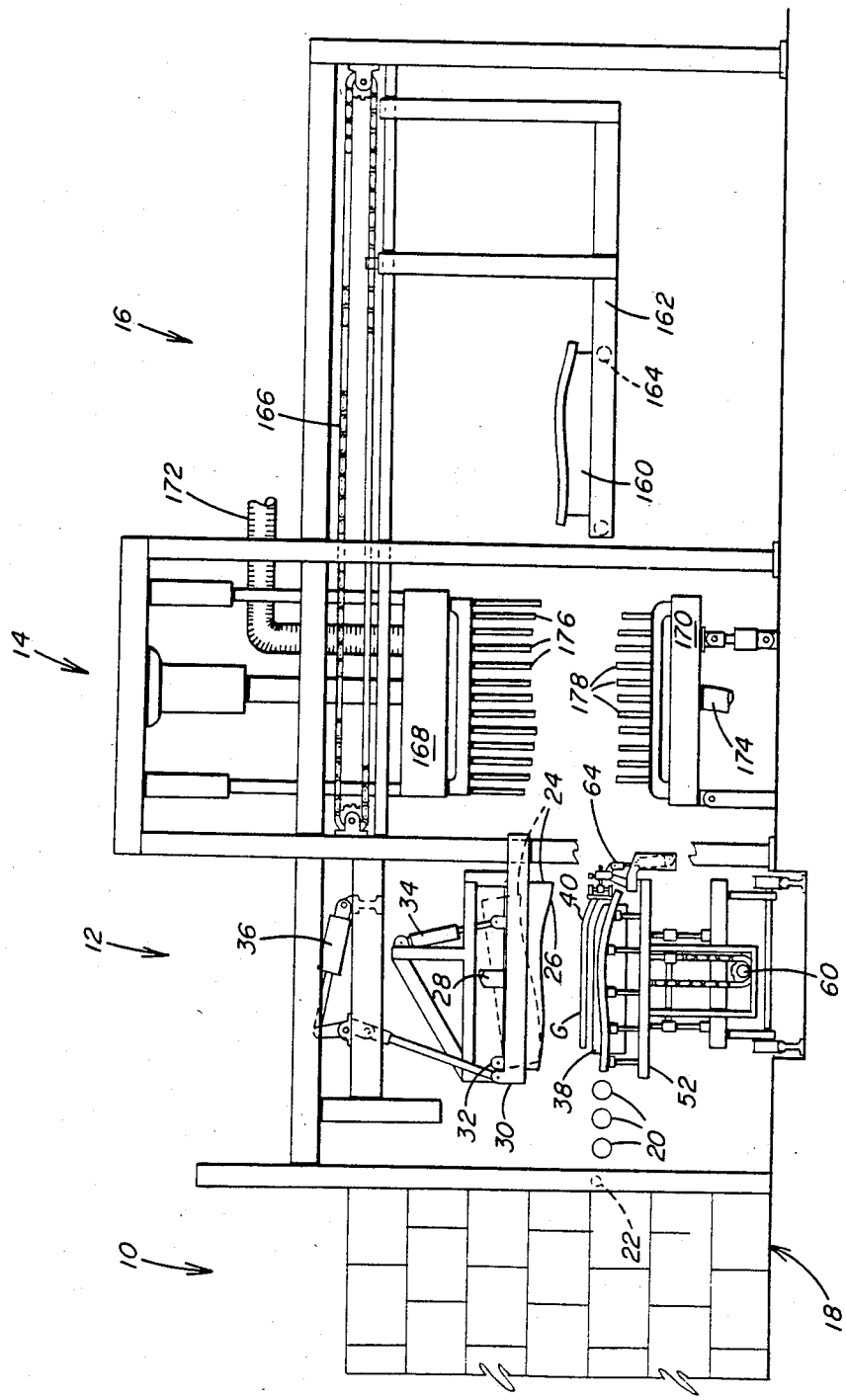
FIG. 1 is an elevational view of a typical heating, shaping, cooling and unloading apparatus.

Referring to FIG. 1, a typical apparatus comprises a heating area 10, a shaping station 12, a cooling station 14 and unloading station 16 shown in end-to-end relation. Glass sheets G are generally conveyed along a path through the heating area 10, preferably a furnace 18 of gas hearth or roller hearth construction, and arrive at the shaping station 12 where they are shaped to the desired configuration and then transported to the cooling station 14. After sufficient exposure to cold blasts at the cooling station, the bent and cooled glass sheet to which the desired degree of temper as been imparted, is transferred to the unloading station 16 and removed. The operation of a typical heating, shaping, cooling and unloading apparatus is described in allowed U.S. Pat. application Ser. No. 616,764 to Bennett et al. which teachings are herein incorporated by reference.

Glass sheets are serially heated as they are conveyed through the furnace 18 and are transferred onto a plurality of transfer rolls 20 and into shaping station 12. The transfer rolls 20 are located in such position that they define a continuation of the conveying surface of the furnace 18.

Also included is a glass sensing mechanism 22 which determines the arrival of the glass sheet at a predetermined location. The sensing mechanism initiates operation of a programmable computer (not shown) that determines the sequence for operating various actuating means, to be discussed hereinafter, so as to insure that the apparatus operates in proper synchronism. While the glass sensing mechanisms is shown at the exit end of the furnace 18 for illustration, it is understood that such a device may be located anywhere along the glass movement path that is convenient.

The shaping station 12 comprises an upper vacuum mold 24 having a downward facing surface that is shaped, e.g., curved in both longitudinally and transverse to the path of travel defined by the transfer rolls 20. The downstream end of the downwardly facing shaping surface of the upper vacuum mold 24 has a downwardly curved end portion 26 of substantially S-shaped configuration. The upper vacuum mold 24 has a vacuum chamber whose downward facing wall is apertured and is covered by a fiberglass cloth cover (not shown) and communicates to a source of vacuum through a flexible vacuum pipe 28. The upper vacuum mold 24 is supported on a support frame 30 and is pivoted about pivot support 32 by piston assembly 34. The support frame 30 moves vertically relative to overhead structure by piston and linkage arrangement 36.

Figure 2:
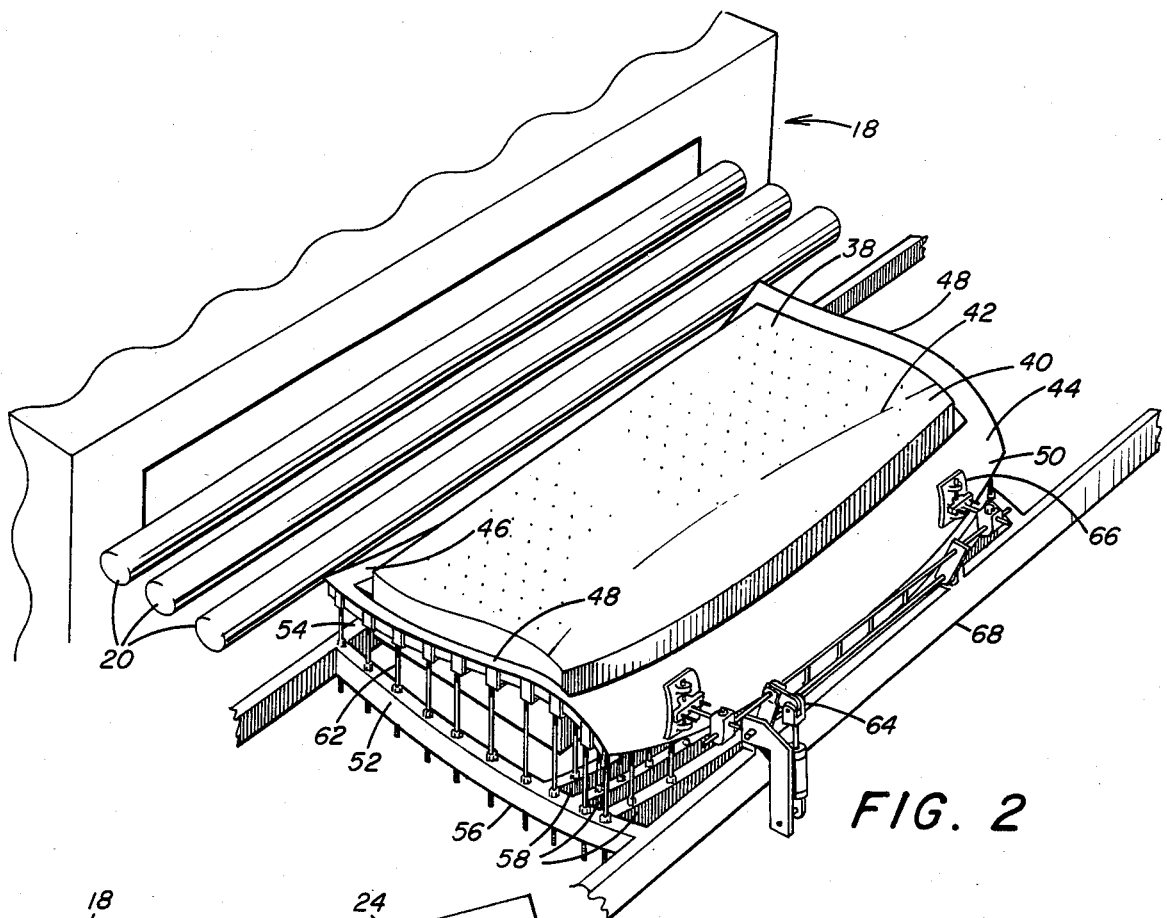
FIG. 2 is a perspective view, having portions removed for purposes of clarity, of a portion of the shaping station of FIG. 1, showing a gas hearth bed with an outline lifting mold having the sheet positioning assembly of the present invention.

A gas hearth bed 38 is disposed beneath the downwardly facing shaping surface of the upper vacuum mold 24. As shown in FIG. 2 the gas hearth bed 38 has a substantially flat upper surface with a downwardly curved downstream end portion 40 that extends downward from a transversely curved boundary 42. The downwardly curved downstream end portion 40 blends downwardly away from the flat upstream portion of the bed 38.

With continued reference to FIG. 2, a lower shaping mold 44 surrounds the gas hearth bed 38. The lower shaping mold 44 comprises a first shaping portion 46 of T-shaped cross section having an upper surface extending transversely of the path of movement defined by the conveying surface of the furnace 18 and the transfer rolls 20. On the sides of the gas hearth bed 38 a pair of side rail portions 48 also of T-shaped cross section extend longitudinally of the path. The rail portions 48 are interconnected by a second rail portion 50 at the downstream end of the lower shaping mold 44. The second rail portion 50 has an upper surface that blends with the shape of the downwardly curved downstream end portion 40 of the gas hearth bed 38. Each of the rail portions 46, 48, and 50 are covered by a continuous heat resistant material such as a material made by Carborundum and sold under the trademark FIBERFRAX 970J.

The lower shaping mold 44 is supported on a rigid reinforcing frame 52. The rigid reinforcing frame 52 includes an auxiliary reinforcing beam 54 below the first rail portion 46, as well as reinforcing beams 56 below the side rail sections 48 and auxiliary reinforcing beams 58 located below the second rail section 50. Elevator means 60 (see FIG. 1) is provided to raise and lower the rigid reinforcing frame 52 together with the lower shaping mold 44 in any convenient manner. Adjustors 62 are provided to vertically adjust the rail portions of the lower shaping mold 44 relative to the rigid reinforcing frame 52.

Figure 4:
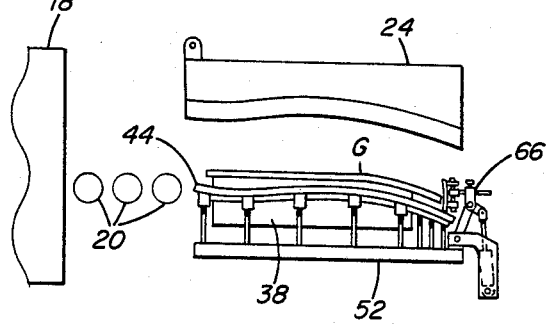
FIG. 4 is a view similar to the view of FIG. 3 showing the shaping molds after arrival of the glass sheet at its shaping position and prior to shaping the sheet.

As shown in FIG. 2, a sheet positioning assembly 64, which is the subject of this invention, is provided at the downstream portion of the rail portion 50. Referring to FIGS. 6-9 in general, and FIG. 6, in particular, the positioning assembly 64 includes a pair of interconnected stop assemblies 66 pivotally mounted on shaft member 68 of the rigid reinforcing frame 52. The stop assemblies 66 are located in positions that would normally be attained by the leading edge of the glass sheet as it droops over the downwardly curved downstream end portion 40 of the gas hearth bed 38 when a glass sheet is delivered to the shaping station 12 for bending, as shown in FIG. 4.

Stop assemblies 66 include a glass sheet engaging member 70 that is pivotally mounted to a head portion 72 of a T-shaped mounting member 74. Referring to FIGS. 8 and 9, apertured bars 76 and 78 are connected to the back surface of the engaging member 70 to receive a threaded bolt 80 which passes through a hole 82 in the head portion 72 of the mounting member 74. Nuts 84 and 86 engage the threaded bolt 80 at bars 76 and 78, respectively. The engaging plate 70 can be adjusted vertically by loosening the nuts 84 and 86, sliding the engaging member 70 into position and thereafter tightening the bolts 84 and 86 against the bars 76 and 78, respectively, to capture the member 70 therebetween. The glass sheet engaging surface of the engaging member 70 is covered with a heat resistant material e.g. material sold under the trademark DURATEMP available from Duratemp Company.

Threaded adjusting bolts 80 and 90 pass through threaded holes 92 and 94, respectively, at the ends of the cross member 96 of the head position 72 as shown in FIG. 7. Rotating the adjusting bolts 88 and 90 moves the ends of the bolts against the glass sheet engaging member 70 to pivot it about the bolt 80. During operation, nuts 84 and 86 firmly engage bars 76 and 78 while bolts 88 and 90 firmly engage member 70 so that glass sheet engaging member 70 remains in a fixed position relative to the mounting member 74.

Referring to FIGS. 8 and 9, a rod portion 98 of the mounting member 74 extends back from the head portion 72, away from the engaging member 70 and passes slidably through clamp member 100. The rod member 98 is retained in a fixed location and orientation at the clamp member by threaded bolt 102 which passes through threaded aperture 104 at clamp 100 and engages the rod 98 to fix its position. The clamp 100 is slidably mounted on an upper shaft 106 and fixed thereon in any convenient manner, e.g. by capturing the shaft 106 in opening 108 of the clamp 100 by rotating threaded bolt 110 to decrease the space in slit 112 which decreases the diameter of the opening 108 thus securing the clamp 100 to the shaft 106 at the desired position.

FIG. 2 illustrates two stop assemblies 66 as described above secured to the shaft 106 but is understood that any number of stop assemblies 66 can be mounted to the shaft 106.

The upper shaft 106 is rigidly connected to a lower shaft 114 by connecting blocks 116 and 118, as shown in FIGS. 6, 7, and 8. The blocks 116 and 118 have an upper aperture 120 and lower aperture 122 through which upper shaft 106 and lower shaft 114 pass and are secured thereto. The connecting block 116 has an additional apertured connecting plate 124 for connection to an assembly pivoting means 126 to be discussed later.

The lower shaft 114 is rotatably mounted in bearing blocks 128 and 130 which are bolted to base plate 132. Base plate 132 is bolted to shaft member 68 of the reinforcing frame 52. Aperture 134 of each of the bearing blocks 128 and 130 is preferably press fit with a bronze bearing 136 to facilitate easier rotation of the lower shaft 114 therein.

With reference to FIG. 8 the entire glass positioning assembly 64 pivots about the lower shaft 114 by the stop assembly pivoting means 126. In the preferred embodiment this pivoting action is provided by an air cylinder 138. The end 140 of piston shaft 142 of the air cylinder 138 has a clevis member 144 that rotatably engages connecting plate 124 of the connecting block 116. The cylinder end 146 of the air cylinder 138 is rotatably connected to an inverted L-shaped brace member 148. The brace member 148 includes an aperture 150 through its upper short leg 152 which engages lower shaft 114 at the bearing block 128. The short leg 152 abuts and is rigidly attached to the bearing block 128 so that the brace member 148 cannot rotate. The short leg 152 extends generally horizontal and back from the stop assemblies 66 with integral leg portion 154 extending generally downward therefrom. An end portion 156 of the leg portion 154 is fitted with a connector 158 for rotatably connecting the cylinder portion 146 of the air cylinder 138 with the brace member 148.

As illustrated in FIG. 8, since the brace member 148 cannot rotate, as the piston shaft 142 of the air cylinder 138 moves in and out it causes the upper shaft 106 and stop assemblies 66 mounted thereon to rotate about the lower shaft 114.

The apparatus as shown in FIG. 1 also includes a ring-like member 160 supported in cantilever relation from a shuttle carriage 162 via cross members 164. A drive 166 moves the carriage 162 and its supported ring-like member 160 between a loading station 16 and a position intermediate the upper vacuum mold 24 and the gas hearth bed 38 when the lower shaping mold 44 is retracted downwardly and then to a position in the cooling station 14.

The cooling station 14 comprises an upper cooling air plenum 168 and a lower cooling air plenum 170. An upper flexible supply pipe 172 supplies air under pressure to the upper cooling air plenum 168 and a similar lower flexible supply pipe 174 supplies cool air under pressure to the lower cooling air plenum 170. Nozzles 176 extend downwardly from the upper cooling plenum 168 and nozzles 178 extend upwardly from lower cooling plenum 170. The length of the nozzles 176 and 178 are such as to provide a shape conforming to the shape of the bent glass sheet.

The operation of the heating, shaping, cooling and unloading apparatus involves mounting a series of spaced glass sheets at the entrance of the tunnel-like furnace 18 and moving the glass sheets through the furnace 18 to heat the glass sheets to their deformation temperature which is in the range of 1200° F. to 1220°

F. (650° C. to 660° C.). The leading glass sheet in the series, when it reaches a position at which it is detected by the glass sensing mechanism 22, actuates the programmable controller (not shown) and is immediately conveyed over the transfer rolls 20 onto a position above the gas hearth bed 38.

Figure 3:
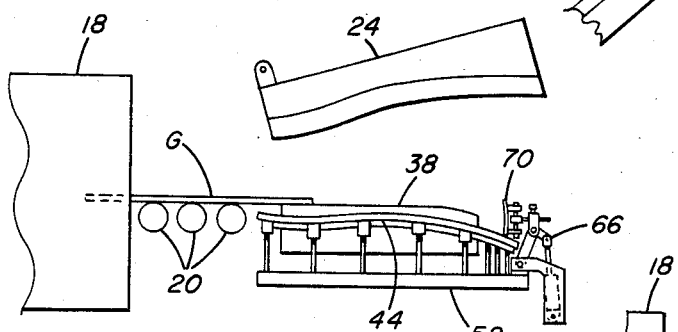
FIG. 3 is a schematic view of a portion of a shaping station showing the relative positions of the shaping members and a glass sheet moving therebetween with the stop assembly in a sheet engaging position.

Referring to FIGS. 3 and 8, the leading edge of the glass sheet is sufficiently hot to conform to the downwardly curved shape of the downstream portion 40 of the gas hearth bed 38. The heated glass sheet travels across the gas hearth bed 38 and contacts the glass sheet engaging member 70 of the prepositioned stop assemblies 66 which are in their upright position at the downstream end of the lower shaping mold 44. In the sheet engaging position, the piston shaft 142 of the air cylinder 138 is fully extended. At the proper time, depending upon the speed of rotation of the transfer rolls 20, which delivers the glass sheet at a higher speed than the conveying speed within the furnace 18, the elevator means 60 (see FIG. 1) is actuated to lift the lower shaping mold 44.

The outline shaping mold 44 engages a frame-like perimeter portion of the glass, lifts it off the glass hearth bed 38 and forces it up against the downwardly facing shaping surface of the upper vacuum mold 24. After the lower shaping mold 44 lifts the glass sheet off the gas hearth bed 38 and towards the upper vacuum mold 24, but prior to the glass sheet being sandwiched between the two molds, the stop assembly 66 of the glass positioning assembly 64 pivot back about shaft 116 by retracting the piston shaft 142 of the air cylinder 138 to the non-engaging position, as illustrated in FIG. 5 and by the dashed lines in FIG. 8.

Figure 5:
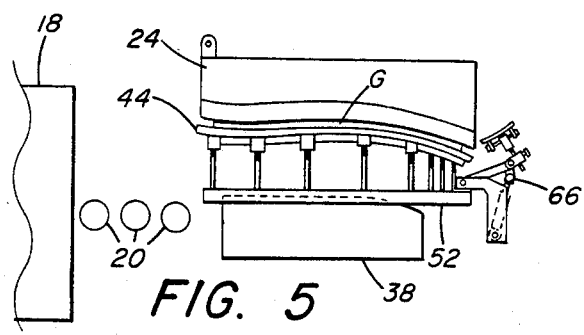
FIG. 5 is a view similar to the view of FIG. 3 showing a glass sheet being shaped between the upper and lower molds of the shaping station and the stop assembly in a retracted non-engaging position.

The upper vacuum mold 24 which is pivoted initially in the obliquely upward position as shown by the dash lines in FIG. 1, and also depicted in FIG. 3, is pivoted downward to a position shown in full lines in FIG. 1 and FIG. 4, while the lower shaping mold 44 moves upward to press the glass sheet G between lower shaping mold 44 and upper vacuum mold 24, as illustrated in FIG. 5, to develop the shape required.

A vacuum is applied to the vacuum mold to engage the glass sheet by vacuum and to ensure that the glass sheet conforms more closely to the shape of the upper mold 24. The lower mold 44 is then lowered to the retracted position and the ring-like member 160 is transferred into a position below the upper vacuum mold. The glass positioning assembly 64 is pivoted upward into a position for engaging the next glass sheet to be shaped. The vacuum mold 24 may be pivoted upward again after it engages the glass sheet to permit the ring-like member 160 to move into position to receive the glass sheet G engaged by vacuum against the lower surface of the vacuum mold 24. After the ring-like member 160 arrives in position beneath the upper vacuum mold 24, the upper vacuum mold 24 is again pivoted in a horizontal disposition and the glass sheet is released by releasing the vacuum. The glass sheet then drops onto the upper surface of the ring-like member 160 which conforms in an outline shape slightly inward of the glass sheet outline and supports it for movement into the cooling station 14 where the ring-like member 160 is reciprocated lineally while air is blasted against the upper and lower surfaces of the glass sheet at a rate sufficient to impart a desired degree of temper in the glass. When sufficient cooling has taken place, the shuttle carriage 164 moves the ring-like member 160 into the unloading station 16 where the glass sheet is removed from the ring-like member 160 and the latter is returned into a parking position at the cooling station 14 to await the disposition of the next glass sheet. At the same time, the upper vacuum mold 24 which has been again pivoted into an upward, oblique position to permit clearance for the next glass sheet to enter the shaping station 12 below the upper vacuum mold 24 remains in such position until such time as the next sheet completes its arrival.

It should be understood that although the prior discussion included the positioning of glass sheets, the sheet positioning assembly disclosed in this invention can be used for positioning sheets of materials other than glass, e.g., plastics, ceramics, etc.

The form of this invention shown and described in this disclosure represents an illustrative preferred embodiment. It is understood that various other changes may be made without departing from the gist of the invention as defined in the claimed subject matter with follows.

I claim:

1. An apparatus for positioning in a shaping station having a center sheet support and a vertically reciprocating shaping mold means positioned external of the perimeter of said center sheet support comprising:
   member for contacting and positioning an edge of said sheet;
   means to maintain said member in a sheet engaging position prior to said sheet contacting said shaping mold wherein said member contacts said sheet edge; and
   means to remove said member to a non-engaging position away from said shaping mold after said shaping mold contacts said sheet.

2. An apparatus as in claim 1 further including means for pivotally mounting said engaging member relative to said sheet engaging surface of said mold and further wherein said removing means pivots said sheet engaging member from said engaging position to said non-engaging position.

3. An apparatus as in claim 2 wherein said mounting means is a frame pivotally mounted on a mold reinforcing frame located below said mold and further wherein said removing means is a reciprocating cylinder rotatably mounted to said pivoting frame and said mold reinforcing frame such that when said cylinder is in an extended position said sheeting engaging member is pivoted into said engaging position and when said cylinder is in a retracted position, said sheet engaging member is pivoted into said non-engaging position.

4. An apparatus as in claim 3 wherein said pivoting frame pivots about an axis parallel to the plane of said sheet as it is conveyed onto said mold.

5. An apparatus as in claim 3 wherein said mold is a lower mold vertically disposed below an upper mold with a downwardly facing sheet engaging surface and wherein said engaging position is a position between said sheet engaging surfaces of said upper and lower molds and said non-engaging position is a position laterally disposed from an area between said sheet engaging surfaces of said upper and lower molds.

6. An apparatus as in claim 5 wherein an edge of said sheet contacts said sheet engaging member and further wherein said sheet engaging member is a plate member with a major surface generally perpendicular to said sheet engaging surface of said mold and contoured to correspond with the contour of the contacted edge of said sheet.

7. An apparatus as in claim 6 further including means to adjust the orientation and position of said sheet engaging member to coincide with a desired location of said contacted edge of said sheet.

8. Apparatus for bending glass sheets comprising:
a center sheet support;
an outline mold positioned externally of the perimeter of said center sheet support including shaping rail portions each defining a different portion of an upwardly facing shaping surface;
an upper mold above said outline mold, said upper mold having downwardly facing shaping surface portions complimentary to the upwadly facing shaping surface of said outline mold;
a sheet engaging member;
means to move said sheet engaging member from a sheet engaging position wherein said member is between said upper mold and said outline mold to a non-engaging position wherein said member is removed from the area between said upper mold and said outline mold; and
means to move said outline mold in a vertical direction between a lower position wherein said sheet engaging member is in said engaging position and contacts and edge of said sheet prior to said sheet contacting said outline mold, and a raised position wherein said sheet engaging member is in said nonengaging position and said sheet is in contact with said outline mold.

9. Apparatus as in claim 8 further including a ring-like member movable along a path below said downwardly facing shaping surface and above said engaging position of said sheet engaging member when said outline mold is in its said lower position.

10. Apparatus as in claim 9 wherein said upper mold is a vacuum mold.

* * * * *